United States Patent
Truninger et al.

(10) Patent No.: US 10,478,011 B2
(45) Date of Patent: Nov. 19, 2019

(54) METHOD FOR PREPARING A FRESH BREWED COLD COFFEE BEVERAGE AND COFFEE MACHINE FOR CONDUCTING SUCH METHOD

(71) Applicant: Schaerer AG, Zuchwil (CH)

(72) Inventors: Rudi Truninger, Long Beach, CA (US); Steven Eckenhausen, Long Beach, CA (US)

( * ) Notice: Subject to any disclaimer, the term of this patent is extended or adjusted under 35 U.S.C. 154(b) by 601 days.

(21) Appl. No.: 14/505,738

(22) Filed: Oct. 3, 2014

(65) Prior Publication Data

US 2015/0272382 A1    Oct. 1, 2015

(30) Foreign Application Priority Data

Apr. 1, 2014 (CH) ........................................ 498/14

(51) Int. Cl.
| | |
|---|---|
| *A47J 31/56* | (2006.01) |
| *A47J 31/42* | (2006.01) |
| *A47J 31/44* | (2006.01) |
| *A47J 31/46* | (2006.01) |

(52) U.S. Cl.
CPC ............... *A47J 31/56* (2013.01); *A47J 31/42* (2013.01); *A47J 31/4403* (2013.01); *A47J 31/46* (2013.01)

(58) Field of Classification Search
CPC ........ A47J 31/56; A47J 31/42; A47J 31/4403; A47J 31/46
USPC ......... 99/286, 279, 280, 281, 290, 295, 300, 99/302 R, 304, 307, 323, 323.3; 426/433–434, 520, 522, 524
See application file for complete search history.

(56) References Cited

U.S. PATENT DOCUMENTS

| | | | |
|---|---|---|---|
| 4,211,342 A | | 7/1980 | Jamgochian et al. |
| 4,550,651 A | * | 11/1985 | Haynes .................. A47J 31/467 |
| | | | 426/433 |
| 4,608,916 A | * | 9/1986 | Becker ..................... A47J 31/06 |
| | | | 99/283 |
| 4,649,809 A | | 3/1987 | Kanezashi |
| 4,852,472 A | | 8/1989 | In-Albon et al. |
| 5,189,949 A | | 3/1993 | Apa |

(Continued)

FOREIGN PATENT DOCUMENTS

| | | |
|---|---|---|
| CH | 682798 A5 | 11/1993 |
| CN | 101466292 A | 6/2009 |

(Continued)

OTHER PUBLICATIONS

International Search Report and Written Opinion dated Apr. 21, 2016 for PCT/EP2015/000309.

(Continued)

*Primary Examiner* — Christopher S Kim
(74) *Attorney, Agent, or Firm* — Pearne & Gordon LLP

(57) ABSTRACT

An energy-saving method for preparing a fresh brewed cold coffee beverage comprises the steps of:
  a. filling a brewing means with a predetermined quantity of coffee powder;
  b. brewing a hot coffee beverage by pushing hot water and/or hot steam through said predetermined quantity of coffee powder in said brewing means;
  c. cooling down said hot coffee beverage by exclusively bringing it in thermal contact with a stream of cold water; and
  d. dispensing said cooled-down coffee beverage at a coffee outlet.

26 Claims, 3 Drawing Sheets

(56) References Cited

U.S. PATENT DOCUMENTS

| | | | |
|---|---|---|---|
| 5,312,020 A | 5/1994 | Frei | |
| 5,584,229 A | 12/1996 | Anson | |
| 5,724,883 A * | 3/1998 | Usherovich | A47J 31/057 426/433 |
| 5,855,162 A | 1/1999 | Bauer et al. | |
| 5,941,163 A | 8/1999 | Park et al. | |
| 5,957,033 A | 9/1999 | In-Albon | |
| 6,118,933 A * | 9/2000 | Roberson | A47J 31/41 222/146.5 |
| 6,182,555 B1 | 2/2001 | Scheer et al. | |
| 6,345,729 B1 | 2/2002 | Santy, Jr. | |
| 8,635,944 B2 | 1/2014 | Buchholz et al. | |
| 2002/0134248 A1 | 9/2002 | Eugster | |
| 2003/0052206 A1 | 3/2003 | Fouquet | |
| 2003/0066430 A1 | 4/2003 | Bitar et al. | |
| 2003/0079612 A1 | 5/2003 | Con | |
| 2004/0118291 A1 | 6/2004 | Carhuff et al. | |
| 2005/0045655 A1 | 3/2005 | Santy, Jr. | |
| 2005/0066820 A1 * | 3/2005 | Lussi | A47J 31/54 99/279 |
| 2006/0230943 A1 | 10/2006 | Stieger et al. | |
| 2006/0286262 A1 | 12/2006 | Stearns et al. | |
| 2007/0202234 A1 | 8/2007 | Ludwig | |
| 2009/0214742 A1 | 8/2009 | Peden et al. | |
| 2009/0293733 A1 | 12/2009 | Martin et al. | |
| 2010/0018407 A1 * | 1/2010 | Liu | A47J 31/36 99/302 R |
| 2010/0162898 A1 | 7/2010 | Mahlich | |
| 2010/0212508 A1 | 8/2010 | Buttiker | |
| 2010/0260907 A1 | 10/2010 | Buchholz et al. | |
| 2010/0276452 A1 | 11/2010 | Vesborg et al. | |
| 2011/0014339 A1† | 1/2011 | Stahl et al. | |
| 2011/0045152 A1† | 2/2011 | Stutz et al. | |
| 2011/0185909 A1 | 8/2011 | Sinzig | |
| 2011/0301738 A1 | 12/2011 | Freeman | |
| 2012/0006204 A1 | 1/2012 | Eidenschink et al. | |
| 2012/0125205 A1 * | 5/2012 | Glucksman | A47J 31/32 99/302 R |
| 2012/0285966 A1 | 11/2012 | Mori et al. | |
| 2013/0085874 A1 | 4/2013 | Gagne et al. | |
| 2013/0087050 A1 | 4/2013 | Studor et al. | |
| 2013/0263745 A1 | 10/2013 | Bombeck et al. | |
| 2013/0319252 A1 | 12/2013 | Castelli et al. | |
| 2014/0053734 A1 * | 2/2014 | Santi | A47J 31/0647 99/282 |
| 2014/0272051 A1 | 9/2014 | Kindler et al. | |
| 2015/0020691 A1 | 1/2015 | Midden et al. | |
| 2015/0102062 A1 | 4/2015 | Mosimann et al. | |

FOREIGN PATENT DOCUMENTS

| | | |
|---|---|---|
| CN | 101827779 A | 9/2010 |
| DE | 8907183 U1 | 7/1989 |
| DE | 4137324 C1 | 2/1993 |
| DE | 20102048 U1 | 1/2002 |
| DE | 202008018339 U1 | 3/2003 |
| DE | 102004025037 A1 | 12/2005 |
| DE | 202007008814 U1 | 11/2007 |
| DE | 102007060476 A1 | 2/2009 |
| DE | 202011051719 U1 | 1/2012 |
| DE | 202008018339 U1 | 3/2013 |
| EP | 0373985 A1 | 6/1990 |
| EP | 0528758 A1 | 2/1993 |
| EP | 0761150 A1 | 3/1997 |
| EP | 0820715 A1 | 1/1998 |
| EP | 1352599 A1 | 10/2003 |
| EP | 1626375 A1 | 2/2006 |
| EP | 1731064 A1 | 12/2006 |
| EP | 2011421 A1 | 1/2009 |
| EP | 2011422 A1 | 1/2009 |
| EP | 2030538 A2 | 3/2009 |
| EP | 2036466 A1 | 3/2009 |
| EP | 2078481 A1 | 7/2009 |
| EP | 2119383 A1 | 11/2009 |
| EP | 2130466 A1 | 12/2009 |
| EP | 2175220 A2 | 4/2010 |
| EP | 2189085 A1 | 5/2010 |
| EP | 2198762 A1 | 6/2010 |
| EP | 2220972 A1 | 8/2010 |
| EP | 2238876 A2 | 10/2010 |
| EP | 2 278 240 A2 | 1/2011 |
| EP | 2412280 A1 | 2/2012 |
| EP | 2478803 A1 | 7/2012 |
| EP | 2 583 596 A1 | 4/2013 |
| EP | 2268175 B1 | 5/2013 |
| EP | 2238876 B1 | 10/2013 |
| FR | 2544185 A3 | 10/1984 |
| IT | 1242161 B | 2/1994 |
| JP | S52-044084 U | 3/1977 |
| JP | H06-022856 A | 2/1994 |
| JP | H09-122016 A | 5/1997 |
| JP | 10287394 | 10/1998 |
| JP | 2007-202943 A | 8/2007 |
| JP | 2009255942 A | 11/2009 |
| WO | 9302605 A1 | 2/1993 |
| WO | 9307792 A1 | 4/1993 |
| WO | 0174211 A1 | 10/2001 |
| WO | 2005113411 A2 | 12/2005 |
| WO | 2006090183 A2 | 8/2006 |
| WO | 2006135864 A2 | 12/2006 |
| WO | 2007072374 A2 | 6/2007 |
| WO | 2007/141334 A1 | 12/2007 |
| WO | 2008015097 A2 | 2/2008 |
| WO | 2008/061726 A2 | 5/2008 |
| WO | 2009027259 A2 | 3/2009 |
| WO | 2009056426 A1 | 5/2009 |
| WO | 2009/074555 A2 | 6/2009 |
| WO | 2009081299 A1 | 7/2009 |
| WO | 2009130099 A1 | 10/2009 |
| WO | 2009140349 A2 | 11/2009 |
| WO | 2010026045 A1 | 3/2010 |
| WO | 2011/135479 A1 | 11/2011 |
| WO | 2011139151 A1 | 11/2011 |
| WO | 2012036635 A1 | 3/2012 |
| WO | 2013117362 A1 | 8/2013 |
| WO | 2013/157751 A1 | 10/2013 |

OTHER PUBLICATIONS

International Search Report dated Aug. 8, 2013 for PCT/EP2013/052780.

International Search Report dated Mar. 28, 2013 for PCT/EP2013/052779.

International Search Report dated May 16, 2013 for PCT/EP2013/057911.

International Search Report and Written Opinion dated Apr. 21, 2015 for PCT/EP2015/000309.

Notice of Opposition filed in related EP Application No. 15705771.2 (EP3 125 730) filed on Feb. 12, 2015.

\* cited by examiner
† cited by third party

METHOD FOR PREPARING A FRESH BREWED COLD COFFEE BEVERAGE AND COFFEE MACHINE FOR CONDUCTING SUCH METHOD

BACKGROUND OF THE INVENTION

The present invention relates to the field of preparation of beverages. It refers to a method for preparing a fresh brewed cold coffee beverage according to the preamble to claim 1.

The invention further refers to a coffee machine for conducting such method.

PRIOR ART

Document EP 2 130 466 A1 describes a machine for the preparation of beverages, which comprises a device for the preparation of coffee or tea to which water heated in a heat exchanger is delivered. The brewed beverage can then be dispensed as required either directly at a first outlet or is sent through a cooling arrangement equipped with a Peltier element and is then dispensed in cooled form at a second outlet.

The document EP 2 238 876 B1 discloses a method for producing a fresh cold coffee beverage from a predetermined quantity of ground coffee, comprising the following method steps: (S1) delivering the predetermined quantity of ground coffee into a brewing chamber; (S2) producing a coffee concentrate from the delivered predetermined quantity of ground coffee by means of a brewing process in the brewing chamber, wherein the coffee concentrate thus produced has a predeterminable multiple of a concentration (KN) of a normal drinking quality of filter coffee with approximately 1.2 to 1.4% dry substance; (S3) producing a fresh cold coffee beverage by mixing the coffee concentrate thus produced with a quantity of water which corresponds to a predeterminable multiple (VM) of the quantity of fresh coffee concentrate produced. A heat exchanger is not provided here.

The document EP 2 268 175 B1 describes a method for producing a beverage, wherein a cold beverage, in particular iced coffee, is produced continuously from a hot beverage, in particular coffee/espresso, produced in a beverage preparation appliance by means of a hot beverage preparation device, in particular coffee/espresso, immediately following the hot beverage preparation without direct addition of cooling agents, in particular ice, iced water or cooling elements, in the same beverage preparation appliance by means of a cooling device. Downstream of the cooling device in terms of flow, water, in particular cooled water, from a water source can be admixed with the cooled hot beverage. The cooling device comprises at least one first heat exchanger having at least one first flow channel arrangement for a beverage to be cooled, said arrangement being fluidically connected at the outlet end to a (cold) beverage outlet of the beverage preparation device, and a cooling assembly connected to the heat exchanger. In all cases active cooling means are employed.

The document EP 2 478 803 A1 discloses a machine for dispensing hot and cold beverages with a brewing chamber which is supplied with hot water for brewing the beverage. The brewed beverage can either be directly dispensed hot or for cooling can be sent through a heat exchanger which is connected to a cooling unit. Here too active cooling is employed.

The U.S. Pat. No. 4,550,651 describes a coffee machine in which hot brewing water is delivered to a brewing basket. The brewed coffee flows into a holding and cooling tank and is then heated in portions as required in a heat exchanger which takes heat from a brewing water reservoir. The freshly brewed coffee can be cooled in the holding and cooling tank, as it gives off heat in a heat exchanger to fresh water which is delivered to the brewing water reservoir.

The U.S. Pat. No. 5,724,883 discloses a coffee machine for brewing hot and cold beverages. For production of a cold coffee beverage the freshly brewed hot filter coffee is subjected to a three-stage cooling process which provides air cooling in a first stage, a heat exchange with freshly delivered water in the second stage and a heat exchange with a cooling cartridge in a third stage.

The document WO 2007/072374 A2 describes a coffee machine in which the cooling of the brewed beverage takes place by external addition of ice.

In the solution given in WO 2009/081299 A1 as well as the addition of ice the temperature of the water required for the brewing process is also lowered.

WO 2012/036635 A1 discloses a coffee machine in which, as required, before dispensing, the hot brewed beverage is led through a cooling chamber operating with Peltier elements for cooling.

All known coffee machines which provide for dispensing of a cold or significantly cooled coffee beverage are either of complicated construction or require additional energy for cooling, which is necessary for special active cooling arrangements such as Peltier elements or cooling circuits operating with a compressor.

In this case it should also be taken into consideration that a cooling of the coffee beverage must take place only in so far as subsequently added ice cubes do not melt immediately and excessively dilute the beverage from the outset.

SUMMARY OF THE INVENTION

It is therefore an object of the invention to create a coffee machine which in a simple and energy-saving manner enables the selective dispensing of hot or cooled coffee.

A further object of the invention is to provide a method for operating such a coffee machine.

This and other objects are achieved by the features of claims 1 and 14.

Method for preparing a fresh brewed cold coffee beverage according to the invention comprises the steps of.
a) filling a brewing means with a predetermined quantity of coffee powder;
b) brewing a hot coffee beverage by pushing hot water and/or hot steam through said predetermined quantity of coffee powder in said brewing means;
c) cooling down said hot coffee beverage by exclusively bringing it in thermal contact with a stream of cold water; and
d) dispensing said cooled-down coffee beverage at a coffee outlet.

An embodiment of the inventive method is characterized in that said thermal contact preferably comprises a heat exchange between said hot coffee and a first stream of cold water in at least one heat exchanger.

Another embodiment of the inventive method is characterized in that said thermal contact further comprises admixing a predetermined quantity of cold water in a second stream with the coffee beverage coming from said at least one heat exchanger before the coffee beverage is dispensed at said coffee outlet.

Another embodiment of the inventive method is characterized in that said hot water and/or hot steam used for said brewing step is prepared in a boiler, and that said first stream of cold water is fed into said boiler after said heat exchange in said at least one heat exchanger.

A further embodiment of the inventive method is characterized in that said first stream of cold water is discharged after said heat exchange in said at least one heat exchanger.

Just another embodiment of the inventive method is characterized in that said thermal contact comprises a first heat exchange between said hot coffee and a first stream of cold water in a first heat exchanger and a second heat exchange between said hot coffee and a second stream of cold water in a second heat exchanger.

Specifically, said first and second heat exchanges are conducted one after the other.

Specifically, said first and second heat exchanges are conducted in parallel.

Specifically, said first and second heat exchanges are conducted alternatively.

Specifically, said hot water and/or hot steam used for said brewing step is prepared in a boiler, and said first stream of cold water is fed into said boiler after said heat exchange in said first heat exchanger, and said second stream of cold water is discharged after said heat exchange in said second heat exchanger.

A further embodiment of the inventive method is characterized in that for the production of a preselected coffee beverage a specific total amount of cold water is associated with a specific quantity of coffee powder, and that when cold water is admixed the quantity of hot water used for brewing is correspondingly reduced.

Specifically, the quantities of hot water used for brewing and of admixed cold water are controlled by a controller by means of corresponding valves.

Another embodiment of the inventive method is characterized in that said coffee powder provided for brewing is automatically ground and fed into said brewing means.

The coffee machine for conducting said method according to the invention comprises a means for brewing a coffee beverage with an inlet for hot water and an outlet for the brewed coffee beverage, and a coffee outlet which is connected to the outlet of said brewing means by outlet piping means It is characterized in that for cooling of the brewed coffee at least one heat exchanger with a primary and a secondary side is provided, which is inserted with its primary side into said outlet piping means leading from the outlet of said brewing means to said coffee outlet, and the secondary side of which is connected with a cold water inlet.

An embodiment of the inventive coffee machine is characterized in that said coffee machine comprises a boiler with an inlet and an outlet, whereby said inlet of said boiler is connected to said cold water inlet by means of a first cold water feed pipe and said outlet of said boiler dispenses hot water and/or hot steam for brewing said coffee beverage to said inlet of said brewing means, and that said at least one heat exchanger is inserted with its secondary side into said first cold water feed pipe.

Another embodiment of the inventive coffee machine is characterized in that said secondary side of said at least one heat exchanger is further connected with a cooling water discharge pipe such that cooling water flowing through said secondary side from said cold water inlet is discharged through said cooling water discharge pipe.

Specifically, a further heat exchanger is provided, having a primary side and a secondary side, that said further heat exchanger is inserted with its primary side into said outlet piping means leading from the outlet of said brewing means to said coffee outlet, that said further heat exchanger is connected on its secondary side with said cold water inlet and with a cooling water discharge pipe such that cooling water flowing through said secondary side from said cold water inlet is discharged through said cooling water discharge pipe.

More specifically, said primary sides of said first and second heat exchangers are arranged in series within said outlet piping means leading from the outlet of said brewing means to said coffee outlet.

Alternatively, said primary sides of said first and second heat exchangers may be arranged in parallel within said outlet piping means leading from the outlet of said brewing means to said coffee outlet.

A further embodiment of the inventive coffee machine is characterized in that means are provided for adding cold water to the coffee beverage flowing out of said at least one heat exchanger to said coffee outlet.

Specifically, said cold water adding means comprises a second cold water feed pipe which connects said outlet piping means after said at least one heat exchanger to said cold water inlet.

More specifically, a controllable valve is inserted into said second cold water feed pipe and is connected to a controller of said coffee machine for controlling the quantity of cold water added.

Just another embodiment of the inventive coffee machine is characterized in that the primary side of said at least one heat exchanger can be bridged by a hot beverage pipe to which the outlet of said brewing means can be switched over from said outlet piping means.

A further embodiment of the inventive coffee machine is characterized in that said brewing means comprise a brewing unit with a closable brewing chamber into which freshly ground coffee powder can be fed from a grinder and through which pressurized hot water from a boiler flows during brewing of the coffee beverage.

Specifically, said grinder is integrated into said coffee machine.

Specifically, said brewing unit is opened and closed automatically.

BRIEF DESCRIPTION OF THE DRAWINGS

The present invention is now to be explained more closely by means of different embodiments and with reference to the attached drawings.

The invention is explained in greater detail below with reference to embodiments in connection with the drawings. In the drawings.

DETAILED DESCRIPTION OF DIFFERENT EMBODIMENTS OF THE INVENTION

Figure 1:
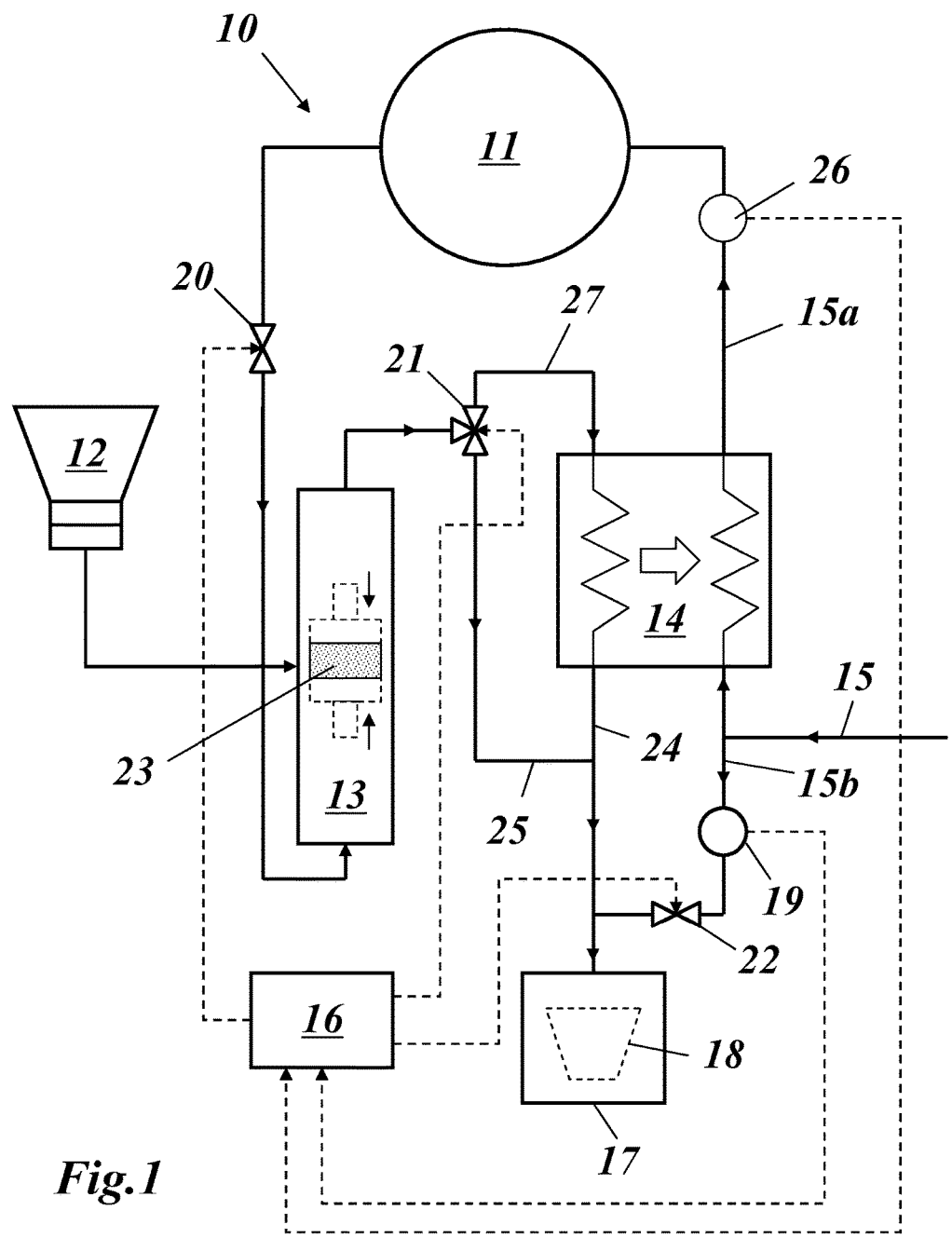
FIG. 1 shows a highly simplified schematic view of a coffee machine with cooling devices comprising a single heat exchanger according to an embodiment of the invention.

FIG. 1 shows the highly simplified construction and operating diagram of an automatic coffee machine according to an embodiment of the invention.

The coffee machine 10 comprises as central component a brewing unit 13 which may be of different construction depending upon the type of brewing process used. In the illustrated example a brewing method is indicated, wherein freshly ground coffee powder is fed into a brewing chamber 23 delimited by two pistons movable relative to one another and there hot brewing water flows from the bottom upwards through the coffee powder. Such a brewing unit is described for example in the document EP 2 036 466 A1 in the name of the applicant.

The hot water necessary for the brewing process is produced in an (electrically heated) boiler 11 which is connected at the outlet end to the inlet of the brewing unit 13 and at the inlet end receives cold fresh water from a cold water inlet 15 via a cold water feed pipe 15*a*. The cold water inlet 15 can be connected directly to an external water supply or to an internal storage tank for fresh water.

The coffee beverage coming out of the brewing unit 13 at the top is delivered by means of a switchover valve 21 selectively via a first hot beverage pipe 27 and a cold beverage pipe 24 or a second hot beverage pipe 25 to a coffee outlet 17, and there it is dispensed into a container 18, a cup, a mug or the like. The switchover valve 21 is actuated by a central controller 16 which controls the outflow of the preparation depending upon the input beverage selection.

The first hot beverage pipe 27 and cold beverage pipe 24 are connected to the primary side of a heat exchanger 14, whilst the cold water inlet 15 and cold water feed pipe 15*a* are connected to the secondary side heat exchanger 14 with cold water feed pipe 15*a* leading to boiler 11. The heat exchanger 14 transfers heat from the hot coffee beverage flowing through the primary side to the fresh cold water flowing through the secondary side on its way to boiler 11. In this way the brewed beverage is significantly cooled in a first step, whilst the fresh water flowing to the boiler 11 is preheated in an energy-saving manner. On the other hand, if switchover valve 21 is switched over, hot brewed beverage is conveyed via bypassing hot beverage pipe 25 to the outlet 17, and the heat exchange does not occur and the usual hot beverage is dispensed.

Thus as a result there is a possibility that both hot and also cooled coffee can be dispensed directly from the machine. A central element in this idea is the heat exchanger 14 just before the coffee outlet 17, through which on the one hand the hot coffee and on the other hand the cold water, which preferably goes into the boiler 11, run. With this heat exchanger 14 the coffee is cooled to a certain degree.

In addition, a second element is that cold water can be added directly to the coffee already cooled in heat exchanger 14 and thus the coffee beverage is cooled further. For this purpose a second cold water feed pipe 15*b* which opens into the pipe leading to the coffee outlet 17 branches off from the cold water inlet 15 and can be opened by actuating valve 22. By adding cold fresh water a direct heat exchange takes place between the two liquids.

The result of the two-stage cooling process is a coffee which is warm at approximately 30-35° C. and is dispensed into a mug with ice (if on the other hand the hot coffee at 90° C. were dispensed into the mug with ice, the ice would immediately melt completely; on the other hand with the warm coffee at 35° C. the quantity of ice is sufficient in order to cool the coffee to almost 0° C. and there is still some ice remaining).

However, the possibility also exists of bypassing the heat exchanger 14, by sending the hot brewed beverage via the hot beverage pipe 25, and subsequently effecting cooling by the addition of cold water via the cold water feed pipe 15*b*.

In this way in principle three different types of cooling are available, namely (1) cooling only by means of heat exchanger 14, (2) cooling only by the addition of cold water and (3) two-stage cooling by heat exchanger 14 and the addition of cold water.

The addition of cold water in the second cooling step changes the concentration of the brewed beverage by dilution. It is therefore advantageous that for the production of a preselected coffee beverage a specific total amount of cold water is associated with a specific quantity of coffee powder and that when cold water is admixed the quantity of hot water used for brewing is correspondingly reduced, so that the total quantity of water remains unchanged. However, it is also conceivable to provide other recipes for the cold coffee beverage than for a hot beverage.

In order that the quantities of hot water used for brewing and of added cold water can be controlled precisely by the controller 16, in the illustrated embodiment of FIG. 1 corresponding controllable valves 20 and 22 are disposed in the associated pipes from the boiler 11 to the brewing unit 13 and in the cold water feed pipe 15*b* and connected to the controller 16. In addition the cold water feed pipes 15*a* and 15*b* can be provided with flow meters 19 and 26 which measure the quantity of water flowing through and transmit the values to the controller 16.

FIG. 1 shows an embodiment as a fully automatic coffee machine which has an integrated grinder 12 in which coffee is freshly ground and fed automatically into the (then opened) brewing chamber 23.

However, the invention can also be employed in other coffee machines with individual preparation, such as for example the hand-filled portafilter machines or so-called ¾ automatic machines (see the document WO 2013/117362 A1), or machines in which the coffee powder for brewing is provided in capsules or sachets and introduced into the brewing unit.

Figure 2:
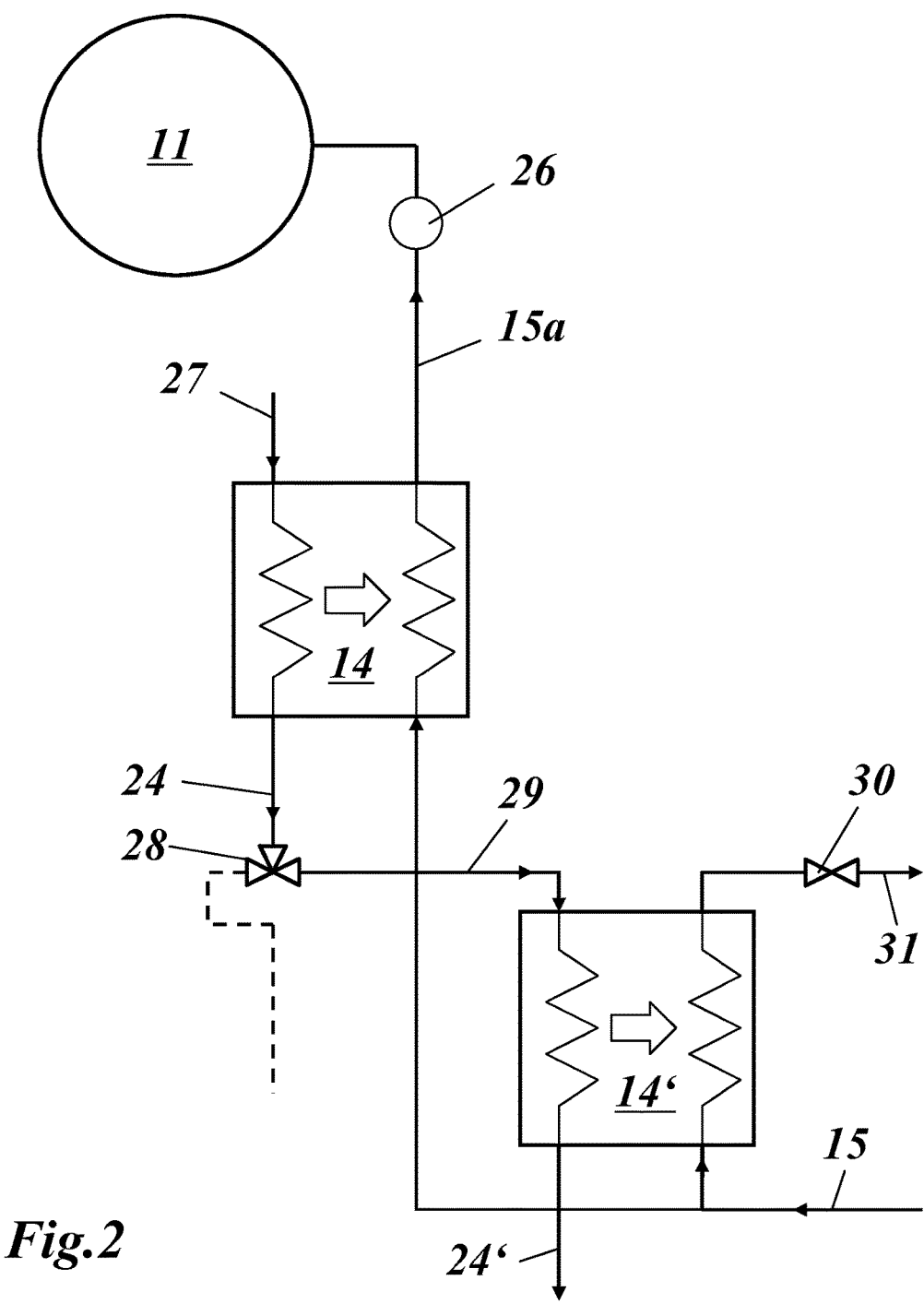
FIG. 2 shows another embodiment of the inventive coffee machine with two heat exchangers in series connection.

FIG. 2 shows in a detail another embodiment of the inventive coffee machine. In this embodiment two different heat exchangers 14 and 14' are used to cool down the brewed coffee beverage. The first heat exchanger 14 plays the same roll as in the embodiment of FIG. 1 and cools the hot coffee beverage by means of a heat exchange with the cold fresh water flowing through cold water feed pipe 15*a*.

A second cooling step can be initiated by switching over a switchover valve 28, which is arranged in cold beverage pipe 24. The coffee beverage cooled down in heat exchanger 14 then flows to the primary side of second heat exchanger 14' via a connecting pipe 29.

In heat exchanger 14' a second heat transfer takes place between the coffee beverage and cold fresh water, which flows through the secondary side of heat exchanger 14' from cold water inlet 15 to a cooling water discharge pipe 31 to be discharged there. The flow of cold water through the secondary side of heat exchanger 14' can be controlled by a valve 30 and is independent of the fresh water requirements of boiler 11. In this way, by combining the two cooling steps within the two heat exchangers 14 and 14', the cooling process can be optimized. When the cooled coffee beverage leaves second heat exchanger 14' through second cold beverage pipe 24' there is still the possibility to add a third cooling step by admixing cold water, as described in connection with the embodiment in FIG. 1.

Figure 3:
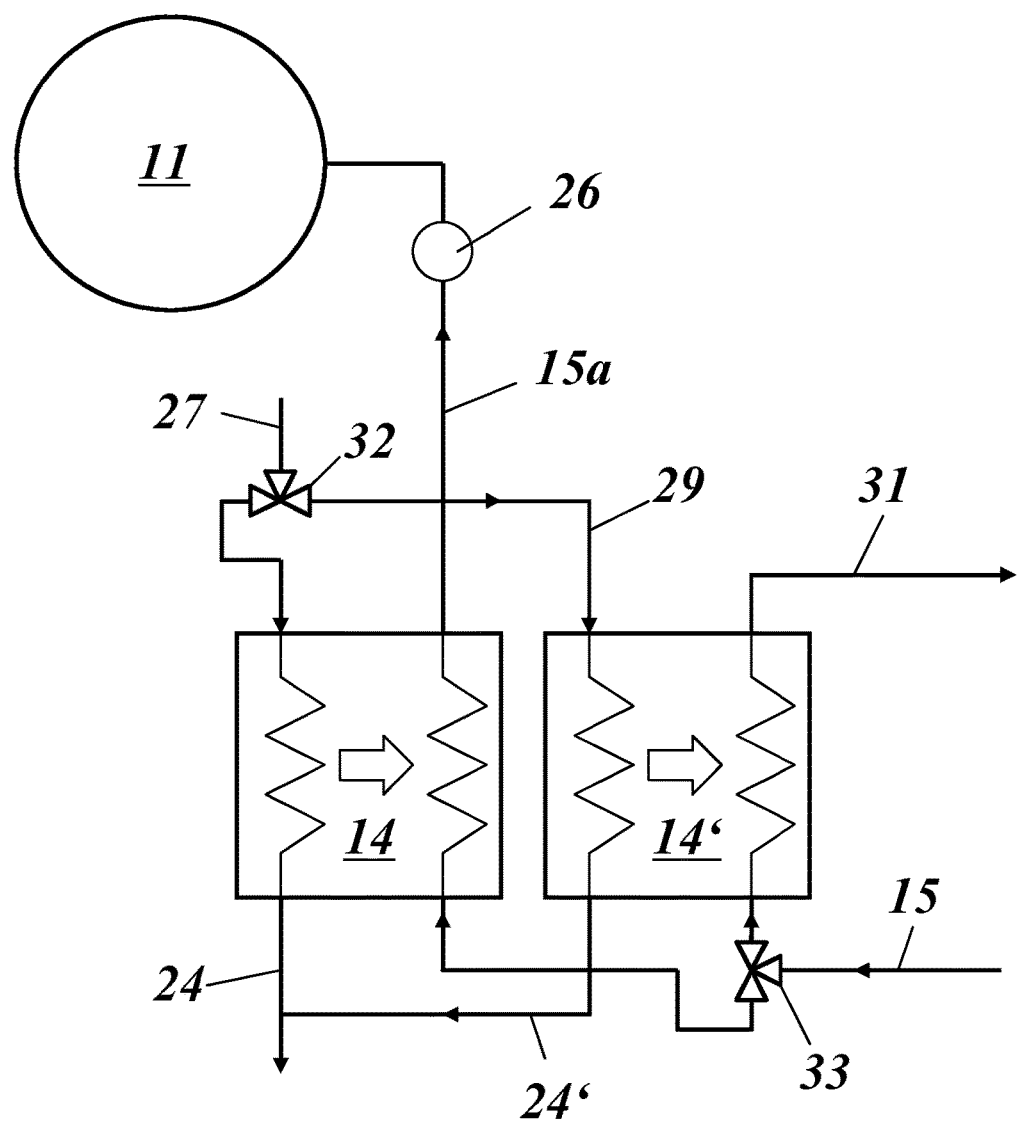
FIG. 3 shows a further embodiment of the inventive coffee machine with two heat exchangers in series connection.

In the embodiment of FIG. 2 the two heat exchangers 14 and 14' are arranged in a series arrangement. However, heat exchangers 14 and 14' may be arranged in a parallel arrangement, as shown in FIG. 3. Here, switchover valves 32 and 33 are used to elect one of the heat exchangers 14 and 14' to cool down the brewed coffee beverage by heat exchange with fresh cold water, which is either supplied to boiler 11 (when heat exchanger 14 is used) or discharged through cooling water discharge pipe 31 (when heat exchanger 14' is used). Instead of an alternative use of heat exchangers 14 and 14', both may be used in parallel, so that part of the heat of the hot coffee beverage is transferred to boiler 11, and part of the heat is discharged through cooling water discharge pipe 31. It is clear that both scenarios can be combined with the subsequent admixture of cold fresh water, as described in connection with the embodiment in FIG. 1.

LIST OF REFERENCE NUMERALS

10 coffee machine
11 boiler
12 grinder
13 brewing unit
14,14' heat exchanger
15 cold water inlet
15a,b cold water feed pipe
16 controller
17 coffee outlet
18 container (mug, cup etc.)
19,26 flow meter
20 valve
21,22 switchover valve
23 brewing chamber
24,24' cold beverage pipe
25,27 hot beverage pipe
30 valve
29 connecting pipe
31 cooling water discharge pipe
28,32,33 switchover valve

What is claimed is:

1. A method for preparing a fresh brewed cold coffee beverage having a target temperature, comprising the steps of:
   a. filling a brewing means with a predetermined quantity of coffee powder;
   b. brewing a coffee beverage having a temperature in excess of the target temperature by pushing a first stream of water and/or steam having a temperature in excess of the target temperature through said predetermined quantity of coffee powder in said brewing means;
   c. reducing a temperature of said coffee beverage to a temperature at or above said target temperature by bringing a first stream of said coffee beverage having a temperature in excess of the target temperature in thermal contact with a first stream of water having a temperature sufficiently below said target temperature such that a heat exchange between said first stream of coffee beverage and said first stream of water reduces the temperature of said first stream of coffee beverage to said temperature at or above said target temperature, said first stream of coffee beverage and said first stream of water running through at least one heat exchanger; and
   d. dispensing a fresh brewed coffee beverage at said temperature at or above said target temperature at a coffee outlet.

2. The method as claimed in claim 1, further comprising a step of admixing a predetermined quantity of water from said first stream of water with the fresh brewed coffee beverage coming from said at least one heat exchanger before the fresh brewed coffee beverage is dispensed at said coffee outlet.

3. The method as claimed in claim 2, wherein for the production of a preselected coffee beverage a specific total amount of water having a temperature below said target temperature is associated with a specific quantity of coffee powder, and that when water having a temperature below said target temperature is admixed a quantity of water having a temperature in excess of the target temperature used for brewing is correspondingly reduced.

4. The method as claimed in claim 3, wherein the quantity of water used for brewing and a quantity of admixed water are controlled by a controller by means of corresponding valves.

5. The method as claimed in claim 1, wherein said first stream of water and/or steam used for said brewing step is prepared in a boiler, wherein said first stream of water is fed into said boiler after said first stream of water exits said at least one heat exchanger.

6. The method as claimed in claim 1, wherein said first stream of water is discharged after exiting said at least one heat exchanger.

7. The method as claimed in claim 1, wherein said thermal contact comprises a first heat exchange between said hot first stream of coffee beverage and said first stream of water in a first heat exchanger and a second heat exchange between the first stream or a second stream of coffee beverage and a second stream of water having a temperature below said target temperature in a second heat exchanger.

8. The method as claimed in claim 7, wherein said first and second heat exchanges are conducted one after the other.

9. The method as claimed in claim 7, wherein said first and second heat exchanges are conducted in parallel.

10. The method as claimed in claim 7, wherein said first and second heat exchanges are conducted alternatively.

11. The method as claimed in claim 7, wherein said first stream of water and/or steam used for said brewing step is prepared in a boiler, and wherein said first stream of water is fed into said boiler after said first heat exchange in said first heat exchanger, and that said second stream of water is discharged after said second heat exchange in said second heat exchanger.

12. The method as claimed in claim 1, wherein said coffee powder provided for brewing is automatically ground and fed into said brewing means.

13. The method as claimed in claim 1, wherein said step of reducing a temperature of said coffee beverage includes flowing said first stream of coffee beverage through said at least one heat exchanger in a first direction and flowing said first stream of water through said at least one heat exchanger in a second direction, the second direction being opposite to the first direction.

14. Coffee machine for preparing a fresh brewed coffee beverage having a target temperature, said coffee machining comprising:
    a brewing means for brewing a coffee beverage with an inlet for a first stream of water and/or steam having a temperature in excess of a target temperature and an outlet for the fresh brewed coffee beverage,
    wherein the brewing means is filed with a predetermined quantity of coffee power and a coffee beverage is brewed to have a temperature in excess of the target temperature by pushing the first stream of water and/or steam having a temperature in excess of target temperature through the predetermined quantity of coffee power in the brewing means;

at least one heat exchanger having a primary side and a secondary side, wherein the primary side is inserted into an outlet piping means leading from the outlet of said brewing means to a coffee outlet, and the secondary side of the at least one heat exchanger is connected with an inlet for a first stream of water having a temperature sufficiently below said target temperature, wherein the temperature of the coffee beverage is reduce to a temperature at or above said target temperature by bringing from said brewing means a first stream of said coffee beverage having a temperature in excess of the target temperature and putting said first stream of said coffee beverage in thermal contact with the first stream of water having a temperature sufficiently below said target temperature such that a heat exchange between said first stream of said coffee beverage and said first stream of water reduces the temperature of said first stream of said coffee beverage to said temperature at or above said target temperature, said first stream of said coffee beverage and said first stream of water running through the at least one heat exchanger; and the coffee outlet connected to the outlet of said brewing means by said outlet piping means, wherein the fresh brewed coffee beverage is dispensed out of the coffee outlet at said temperature at or above said target temperature.

15. The coffee machine as claimed in claim 14, wherein said coffee machine comprises:

a boiler with an inlet and an outlet, wherein said inlet of said boiler is connected to said inlet for the first stream of water having a temperature sufficiently below said target temperature by means of a first water feed pipe and said outlet of said boiler dispenses said first stream of water and/or steam having a temperature in excess of the target temperature for brewing said coffee beverage to said inlet of said brewing means, and wherein said secondary side of said at least one heat exchanger is inserted into said first water feed pipe.

16. The coffee machine as claimed in claim 15, further comprising a further heat exchanger having a primary side and a secondary side, said primary side inserted into said outlet piping means leading from the outlet of said brewing means to said coffee outlet, and said secondary side connected with said inlet for the first stream of water having a temperature sufficiently below said target temperature and with a water discharge pipe such that water flowing through said secondary side from said inlet for the first stream of water having a temperature sufficiently below said target temperature is discharged through said water discharge pipe.

17. The coffee machine as claimed in claim 16, wherein said primary sides of said at least one heat exchanger and said further heat exchanger are arranged in series within said outlet piping means leading from the outlet of said brewing means to said coffee outlet.

18. The coffee machine as claimed in claim 16, wherein said primary sides of said at least one heat exchanger and said further heat exchanger are arranged in parallel within said outlet piping means leading from the outlet of said brewing means to said coffee outlet.

19. The coffee machine as claimed in claim 14, wherein said secondary side of said at least one heat exchanger is further connected with a water discharge pipe such that water flowing through said secondary side from said inlet for the first stream of water having a temperature sufficiently below said target temperature is discharged through said water discharge pipe.

20. The coffee machine as claimed in claim 14, wherein means are provided for adding the first stream of water having a temperature sufficiently below said target temperature to the coffee beverage flowing out of said at least one heat exchanger to said coffee outlet.

21. The coffee machine as claimed in claim 20, wherein said means comprises a second water feed pipe which connects said outlet piping means after said at least one heat exchanger to said inlet for the first stream of water having a temperature sufficiently below said target temperature.

22. The coffee machine as claimed in claim 21, wherein a controllable valve is inserted into said second water feed pipe and is connected to a controller of said coffee machine for controlling the quantity of the first stream of water having a temperature sufficiently below said target temperature that is added.

23. The coffee machine as claimed in claim 14, wherein the primary side of said at least one heat exchanger can be bridged by a beverage pipe to which the outlet of said brewing means can be switched over from said outlet piping means.

24. The coffee machine as claimed in claim 14, wherein said brewing means comprises a brewing unit with a closable brewing chamber into which freshly ground coffee powder can be fed from a grinder and through which pressurized water from a boiler flows during brewing of the coffee beverage.

25. The coffee machine as claimed in claim 24, characterized in that said grinder is integrated into said coffee machine.

26. The coffee machine as claimed in claim 24, characterized in that said brewing unit is opened and closed automatically.

* * * * *

UNITED STATES PATENT AND TRADEMARK OFFICE
CERTIFICATE OF CORRECTION

PATENT NO. : 10,478,011 B2  
APPLICATION NO. : 14/505738  
DATED : November 19, 2019  
INVENTOR(S) : Rudi Truninger et al.

Page 1 of 1

It is certified that error appears in the above-identified patent and that said Letters Patent is hereby corrected as shown below:

In the Claims

Column 7, Line 37, Claim 1, "brewed cold coffee" should be -- brewed coffee --.

Column 8, Line 25, Claim 7, "said hot first" should be -- said first --.

Signed and Sealed this  
Twenty-fourth Day of March, 2020

Andrei Iancu  
*Director of the United States Patent and Trademark Office*